April 13, 1926. M. A. CHRISTIE 1,580,555
DIRIGIBLE HEADLIGHT CONSTRUCTION
Filed Dec. 23, 1924   2 Sheets-Sheet 1
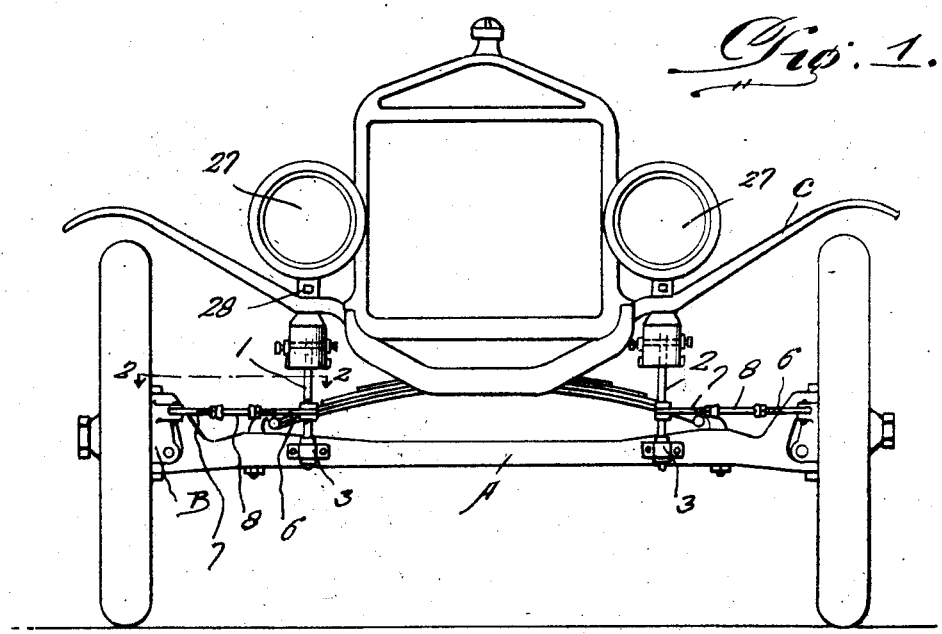

April 13, 1926.

M. A. CHRISTIE 1,580,555

DIRIGIBLE HEADLIGHT CONSTRUCTION

Filed Dec. 23, 1924   2 Sheets-Sheet 2

Inventor
M. A. Christie,
By
Attorney

Patented Apr. 13, 1926.

1,580,555

UNITED STATES PATENT OFFICE.

MERTON ALBERT CHRISTIE, OF EUREKA, CALIFORNIA.

DIRIGIBLE-HEADLIGHT CONSTRUCTION.

Application filed December 23, 1924. Serial No. 757,650.

*To all whom it may concern:*

Be it known that I, MERTON ALBERT CHRISTIE, a citizen of the United States, residing at Eureka, in the county of Humboldt and State of California, have invented certain new and useful Improvements in Dirigible-Headlight Constructions, of which the following is a specification.

This invention relates to improvements in dirigible headlight constructions for motor vehicles and has for its principal object to provide a simple and efficient device whereby the headlights are automatically controlled by the steering mechanism of the automobile, whereby the light rays from the headlights will, at all times, be directed in the path in which the wheels of the automobile are traveling.

Another important object of the invention is to provide a dirigible headlight construction of the above mentioned character, which will at all times be positive and efficient in its operation, and which will not, in any way, interfere with the usual operation of the steering mechanism when in position on an automobile.

A further object of the invention is to provide a dirigible headlight construction wherein means is associated therewith for lubricating the movable parts of the headlight, additional means being provided for accurately focusing the headlight, after the automobile has had its wheels readjusted.

A still further object of the invention is to provide a dirigible headlight construction of the above mentioned character, which is simple in construction, inexpensive, strong and durable, and further well adapted for the purposes for which it is designated.

Other objects and advantages of this invention will become apparent during the course of the following description.

In the accompanying drawings, forming a part of this specification, and in which like numerals designate like parts throughout the same:

Figure 1 is a front elevation, showing the dirigible headlight construction embodying my invention mounted upon an automobile.

Figure 2 is a sectional view, taken approximately on the line 2—2 of Figure 1.

Figure 3:
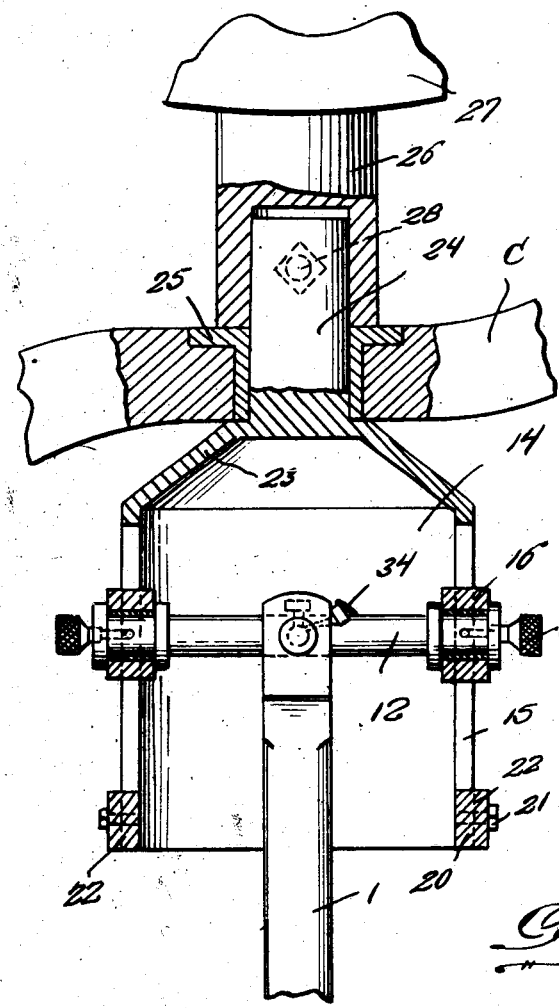
Figure 3 is an enlarged fragmentary sectional view of the cylinder, showing the manner in which the headlight is supported thereon and the connection between the cylinder and the vertical standard.

Figure 7 is a detail side elevation of the cylinder, showing the position of the block and closure in the slot In the drawings, wherein for the purpose of illustration is shown the preferred embodiment of my invention, the numerals 1 and 2 designate a pair of vertically arranged standards, the same being rotatably supported at their lower ends on the front axle A of an automobile, as illustrated at 3. An arm 4 extends laterally from each of the standards adjacent the lower end thereof and a laterally extending arm 5 is provided on the spindle body B of the automobile. An adjustable connection is provided between each of the laterally extending arms 4 and the adjacent laterally extending arm 5 of the spindle body, as is more clearly illustrated in Figure 2.

The adjustable connection includes a pair of rods 6 and 7 which are pivotally secured at their outer ends to the outer ends of each of the laterally extending arms, the inner ends of the rod being threaded, and a turn buckle 8 is associated therewith. The purpose of the adjustable connection is to provide a means whereby each headlight may be accurately focused, in case the wheels of the automobile necessitate readjustment. Furthermore, the provision of a connection between the spindle body of the automobile and the standard, enables the latter to rotate simultaneously with the actuation of the usual steering apparatus of the automobile.

Figure 6:
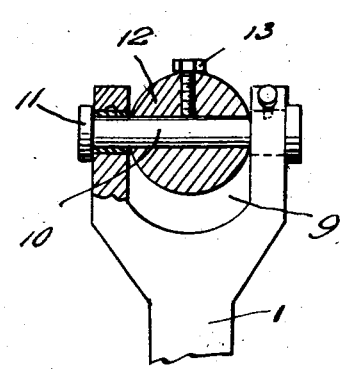
Figure 6 is a detail of the connection between the standard and the shaft.

The upper end of each standard is forked as illustrated at 9, with reference more particularly to Figure 6. A pin 10 extends transversely through the arms of the forked end of each of the standards and a head 11 is associated with the respective ends of each of the pins in order to prevent the accidental displacement. A shaft 12 is detachably supported intermediate its ends by means of a set screw 13 on each of the pins 10, and the shaft 12 is adapted for oscillatory movement on the respective standards.

Figure 4:
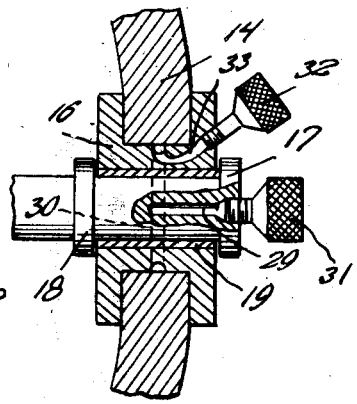
Figure 4 is a sectional view through the slotted portion of the cylinder, showing the blocks carried by each end of the tab.
Figure 5:
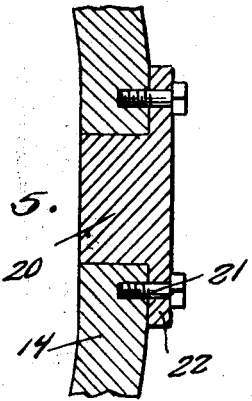
Figure 5 is a fragmentary sectional view of the lower portion of the slotted cylinder, illustrating the closure for the lower portion of the slot.

A cylinder, such as is shown at 14, is disposed over the upper end of each of the standards and is provided with a pair of opposed vertically extending slots 15, through which the respective ends of each shaft is adapted to extend. A block 16 which is substantially H-shaped in top plan is supported on the outer end of each shaft between the collars 17 and 18. A bushing, such as is shown at 19 is associated with the respective ends of each shaft and the H-shaped block in the manner as more clearly illustrated in Figure 4. The H-shaped blocks are adapted for slidable movement within the slots 15 and will not become disengaged therefrom when once in position. The provision of the blocks furthermore provides a means whereby the cylinders will rotate on the respective standards simultaneously with the rotation of the latter.

As is clearly illustrated in Figure 3 of the drawings, the slots 15 extend upwardly from the bottom of each cylinder, and thereby permits the substantially H-shaped blocks 16 to be placed in position within the slots. For the purpose of preventing the displacement of the H-shaped blocks from the slots, a closure such as is shown at 20 is disposed within the lower portion of each of the slots, fastening bolts 21 extending through the flanged portion 22 on the outside of the closure, the threaded ends of said bolts being received in the threaded sockets provided therefor in each of the cylinders at the lower ends thereof on opposite sides of each of the slots. The closure 20 will thus limit the downward movement of the slidable H-shaped blocks 15.

The upper end of each cylinder is closed, as illustrated at 23, and extending upwardly therefrom is the spindle or post 24. Each of the spindles or posts 14 extend vertically through a suitable bushing 25, which is arranged in a suitable opening provided therefor in the respective aprons C of the usual fenders of the automobile. The upper end of each spindle or post is received in the socket member 26 of the headlight 27 and any suitable means, such as is shown at 28 is provided for securing the headlights on the respective spindles or posts.

The outer end of each shaft is provided with a channel 29 which communicates with a transverse channel 30, whereby the bushings and the outer ends of the shafts 12 will be lubricated, the lubricant being supplied thereto through the aforementioned channels from a grease cup 31, threaded in the outer collar 17 in each end of the shaft 12. The opposite sides of the slot 15 are also lubricated through the medium of a grease cup 32 which is carried by each of the slidable blocks 16, a channel 33 being arranged within each block, in the manner as illustrated more clearly in Figure 4. A lubricating means designated generally by the numeral 34 is also associated with the pins 10, which are carried by the upper forked ends of the standards.

It will thus be seen from the foregoing description that a dirigible headlight construction has been provided, wherein the headlights will be automatically and simultaneously actuated so as to direct the rays of light therefrom in the direction in which the wheels of the automobile are turned, so that the road will at all times be illuminated, and will enable the driver of the automobile to readily see the road and the turn therein. The provision of the shaft 12 and the cooperating H-shaped heads and slots in the cylinders will permit the vertical and tiltable movement of the front axle incident to the travelling of the automobile over rough roads so that the headlights will, at all times, be supported in an operative position and will not become disarranged or otherwise rendered inoperative.

The construction of my improved headlight is such as to permit the parts to be readily assembled or disassembled, and by lubricating the movable parts the device is rendered durable.

While I have shown the preferred embodiment of my invention, it is to be understood that various changes in the size, shape, and arrangement of parts may be resorted to, without departing from the spirit of the invention, and the scope of the appended claims.

Having thus described my invention, what I claim is:

1. In a dirigible headlight construction for motor vehicles, a pair of vertically arranged standards rotatably supported at their lower ends on the front axle of the motor vehicle, a connection between each of the standards and the usual steering apparatus of the motor vehicle, a cylinder disposed over the upper end of each standard and adapted for rotation therewith, the upper end of each cylinder being closed, a spindle extending upwardly from the closed end of each cylinder, a headlight secured on said spindle, means associated with said standards and said cylinders to permit the vertical movement of the upper ends of the standards in said cylinders, an additional means for permitting pivotal movement of the upper ends of the standards in said cylinders.

2. In a dirigible headlight construction for motor vehicles, a pair of vertically arranged standards rotatably supported at their lower ends on the front axle of the motor vehicle, a connection between each of the standards and the usual steering apparatus of the motor vehicle, a cylinder pivotally and slidably supported on the upper end of each standard and adapted for rotation therewith, the upper end of each cylinder being closed, a spindle extending upwardly from the closed end of each cylinder, and a headlight secured on said spindle.

3. In a dirigible headlight construction for motor vehicles, a pair of vertically arranged standards rotatably supported at their lower ends on the front axle of the motor vehicle, a connection between each of the standards and the usual steering apparatus of the motor vehicle, a shaft pivotally supported intermediate its ends in the upper portion of each standard, a cylinder disposed over the upper end of each standard, each cylinder being provided with a pair of opposed longitudinally extending slots for receiving the outer ends of each of said shafts whereby the cylinders are adapted for rotation with the standards, said standards being slidably and pivotally associated with the cylinders, the upper end of each cylinder being closed, a spindle extending upwardly from each of the closed ends of the cylinders, and a headlight secured on each spindle.

4. In a dirigible headlight construction for motor vehicles, a pair of vertically arranged standards rotatably supported at their lower ends on the front axle of the motor vehicle, a connection between each of the standards and the usual steering apparatus of the motor vehicle, a shaft pivotally supported intermediate its ends in the upper portion of each standard, a cylinder disposed over the upper end of each standard, each cylinder being provided with a pair of opposed longitudinally extending slots, blocks on the outer ends of each shaft and adapted for slidable movement in said slots, whereby the cylinders are adapted for rotation with the standards, said standards being slidably and pivotally associated with the cylinders, and a spindle extending upwardly from each of the closed ends of the cylinders, and a headlight secured on each spindle.

5. In a dirigible headlight construction for motor vehicles, a pair of vertically arranged standards rotatably supported at their lower ends on the front axle of the motor vehicle, a connection between each of the standards and the usual steering apparatus of the motor vehicle, a shaft pivotally supported intermediate its ends in the upper portion of each standard, each cylinder being provided with a pair of opposed longitudinally extending slots, blocks on the outer ends of each shaft and adapted for slidable movement in said slots, whereby the cylinders are adapted for rotation with the standards, means at the lower portions of said slots to limit the downward movement of said blocks, said standards being slidably and pivotally associated with the cylinders, a spindle extending upwardly from each of the closed ends of the cylinders, and a headlight secured on each spindle.

In testimony whereof I affix my signature.

MERTON ALBERT CHRISTIE.